US008861555B2

(12) United States Patent
Fermann et al.

(10) Patent No.: US 8,861,555 B2
(45) Date of Patent: Oct. 14, 2014

(54) COMPACT COHERENT HIGH BRIGHTNESS LIGHT SOURCE FOR THE MID-IR AND FAR IR

(71) Applicant: IMRA America, Inc., Ann Arbor, MI (US)

(72) Inventors: Martin E. Fermann, Dexter, MI (US); Jens Bethge, Berlin (DE); Ingmar Hartl, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 147 days.

(21) Appl. No.: 13/682,309

(22) Filed: Nov. 20, 2012

(65) Prior Publication Data

US 2014/0219296 A1 Aug. 7, 2014

Related U.S. Application Data

(60) Provisional application No. 61/563,685, filed on Nov. 25, 2011.

(51) Int. Cl.
*H01S 3/30* (2006.01)
*H01S 3/00* (2006.01)
*G02B 6/02* (2006.01)

(52) U.S. Cl.
CPC .......... *H01S 3/0092* (2013.01); *G02B 6/02038* (2013.01)
USPC ........... 372/4; 372/6; 372/18; 372/22; 372/23

(58) Field of Classification Search
USPC ........................................ 372/4, 6, 18, 22, 23
See application file for complete search history.

(56) References Cited

U.S. PATENT DOCUMENTS

| | | | |
|---|---|---|---|
| 4,426,129 A | 1/1984 | Matsumura et al. |
| 4,958,910 A | 9/1990 | Taylor et al. |
| 5,830,622 A | 11/1998 | Canning et al. |
| 5,880,877 A | 3/1999 | Fermann |
| 5,920,588 A | 7/1999 | Watanabe |
| 6,097,741 A | 8/2000 | Lin |
| 6,359,914 B1 | 3/2002 | Powers et al. |
| 6,373,867 B1 | 4/2002 | Lin |
| 6,546,169 B1 | 4/2003 | Lin |
| 6,567,438 B2 | 5/2003 | Lin |
| 6,570,892 B1 | 5/2003 | Lin |

(Continued)

OTHER PUBLICATIONS

International Search Report, PCT/US2012/066083, Mar. 22, 2013.

(Continued)

*Primary Examiner* — Kinam Park
(74) *Attorney, Agent, or Firm* — Sughrue Mion, PLLC; Richard C. Turner

(57) ABSTRACT

Compact laser systems are disclosed which include ultrafast laser sources in combination with nonlinear crystals or waveguides. In some implementations fiber based mid-IR sources producing very short pulses and/or mid-IR sources based on a mode locked fiber lasers are utilized. A difference frequency generator receives outputs from the ultrafast sources, and generates an output including a difference frequency. The output power from the difference frequency generator can further be enhanced via the implementation of large core dispersion shifted fibers. Exemplary applications of the compact, high brightness mid-IR light sources include medical applications, spectroscopy, ranging, sensing and metrology.

47 Claims, 5 Drawing Sheets

(56) References Cited

U.S. PATENT DOCUMENTS

| | | |
|---|---|---|
| 6,590,910 B2 | 7/2003 | Lin |
| 6,643,299 B1 | 11/2003 | Lin |
| 6,760,527 B2 | 7/2004 | Berkey et al. |
| 6,816,515 B1 | 11/2004 | Yun et al. |
| 6,816,652 B1 | 11/2004 | Lin |
| 6,839,363 B2 | 1/2005 | Lin |
| 6,845,108 B1 | 1/2005 | Liu |
| 6,885,683 B1 | 4/2005 | Fermann |
| 7,519,253 B2 | 4/2009 | Islam |
| 7,573,918 B1 | 8/2009 | Soh |
| 7,602,825 B1 | 10/2009 | Lin |
| 7,777,940 B1 | 8/2010 | Delfyett |
| 7,809,222 B2 | 10/2010 | Hartl |
| 7,991,022 B1 | 8/2011 | Soh |
| 8,040,929 B2 | 10/2011 | Imeshev |
| 2002/0001321 A1 | 1/2002 | Perry |
| 2002/0168139 A1 | 11/2002 | Clarkson et al. |
| 2004/0125434 A1* | 7/2004 | Kumar et al. ............ 359/330 |
| 2005/0238070 A1 | 10/2005 | Imeshev |
| 2005/0286108 A1 | 12/2005 | Xu |
| 2010/0225897 A1 | 9/2010 | Fermann |
| 2010/0272129 A1* | 10/2010 | Harter et al. ............ 372/6 |
| 2011/0002691 A1 | 1/2011 | Lin |
| 2011/0121202 A1 | 5/2011 | Li et al. |
| 2012/0062983 A1 | 3/2012 | Imeshev |
| 2012/0133931 A1 | 5/2012 | Fermann |
| 2012/0205352 A1 | 8/2012 | Fermann |
| 2012/0281720 A1 | 11/2012 | Fermann |

OTHER PUBLICATIONS

V.V. Dvoyrin et al., 'Tm3+ doped CW fiber laser based on a highly GeO2 doped dispersion shifted fiber', Optics Express, vol. 19, pp. 7992-7999 (Apr. 2011).

J.W. Fleming, Dispersion in GeO2—SiO2 glasses, Appl. Opt., vol. 23, pp. 4486-4493 (Dec. 1984).

N. Granzow et. al., 'Supercontinuum generation in chalcogenide silica step-index fibers', Opt. Express., vol. 19, pp. 21003 (Oct. 2011).

T.A. Johnson et al., 'Mid-infrared upconversion spectroscopy based on a Yb:fiber femtosecond laser', Applied Phys. B. Published online Oct. 11, 2011. DOI 10.1007/s00340-011-4748-0.

T.A. Johnson et. al., 'Mid-IR frequency comb upconversion spectroscopy', CLEO post deadline paper May 2010.

G. Krauss et al., All-passive phase locking of a compact Er:fiber laser system, Opt. Lett., vol. 36, pp. 540-542 (Feb. 2011).

T. W. Neely et al., High-power broadband laser source tunable from 3.0-4.4 mm based on a femtosecond Yb:fiber oscillator., Optics Letters, vol. 36, pp. 4020-2022 (Oct. 2011).

M. F. Saleh et al., 'Soliton self-frequency blue-shift in gas-filled hollow-core photonic crystal fibers', arXiv:1106.5606v1 physics.optics Jun. 28, 2011.

D. G. Winters et al., Subpicosecond fiber-based soliton-tuned mid-infrared source in the 9.7-14.9 μm wavelength region, Opt. Let., vol. 35, pp. 2179-2181 (Jul. 2010).

* cited by examiner

COMPACT COHERENT HIGH BRIGHTNESS LIGHT SOURCE FOR THE MID-IR AND FAR IR

FIELD OF THE INVENTION

The present invention relates to compact high brightness light sources for the mid and far IR spectral regions, and exemplary applications.

BACKGROUND

Compact high-brightness mid-IR light sources have many applications in medicine, spectroscopy, ranging, sensing and metrology. For mass market applications such sources need to be highly robust, have long term stability and also include a reduced component count with a high degree of optical integration.

Mid-IR and far-IR wavelength ranges, as used in the present application, includes wavelengths from about 2-10 µm and 5-100 µm, respectively. Prior art mid-IR to far-IR light sources are limited in output power, spectral coverage for wavelengths>5 µm, wavelength tunability, and/or limited optical conversion efficiency to the mid-IR.

Difference frequency generation (DFG) may be utilized for generation of mid-IR or far IR outputs. Performance constraints can arise as a result of the limited coherence of the DFG pump sources and/or relatively complex system assembly involving typically two separate optical paths, a path delay adjustment stage, as well as a beam-splitter.

Frequency down-conversion via DFG using systems based on mode locked fiber lasers has recently attracted a lot of attention, see for example D. G. Winters et al., Subpicosecond fiber-based solution-tuned mid-infrared source in the 9.7-14.9 µm wavelength region, Opt. Lett., vol. 35, pp. 2179-2181 (2010) and T. W. Neely et al., 'High-power broadband laser source tunable from 3.0-4.4 µm based on a femtosecond Yb:fiber oscillator.", Optics Letters, vol. 36, pp. 4020-2022 (2001) as well as G. Krauss et al., All-passive phase locking of a compact Er:fiber laser system, Opt. Lett., vol. 36, pp. 540-542 (201)).

The main drawbacks of the prior art systems were, for example, limited coherence of the DFG output (Winters and Neely) or the lack of frequency down-conversion (Krauss). In addition these systems were relatively large and incorporated many bulk optical components.

A need exists for compact, wavelength-tunable and robust high power coherent DFG sources with reduced component count and broadband IR capability.

SUMMARY OF THE INVENTION

Compact laser systems for coherent mid-IR generation based on DFG are disclosed, including ultrafast fiber laser sources in conjunction with nonlinear fibers and waveguides, as well as crystals designed for DFG.

Ultrafast fiber laser sources based on passively mode locked Er fiber lasers operating in the 1500-1600 nm wavelength region, or Tm fiber lasers operating near 2000 nm, are particularly attractive. In some embodiments mode locked fiber oscillators are combined with fiber amplifiers to increase their pulse energy, generating a high power optical pump source.

To increase the spectral bandwidth of the sources, at least a fraction of the output of the high power pump sources are coupled into a highly nonlinear fiber or waveguide designed with a zero dispersion wavelength near the output wavelength of the source, thereby generating a spectrally broadened source.

As disclosed in 'Broadband Generation of Coherent Continua with Optical Fibers', U.S. Patent Application No. 61/483,472, ('472), filed May 6, 2011, to Fermann et al., the coherence of spectrally broadened sources is increased by implementing highly nonlinear fibers or waveguides that produce a supercontinuum output characterizable by a first order coherence function having a value>0.9 at two spectral locations within said supercontinuum, wherein said spectral locations are separated by at least half an octave. Alternatively, a high level of coherence of the spectrally broadened source is ensured by using nonlinear fibers with high levels of Germania concentrations or nonlinear fibers or waveguides with a relatively high vibrational contribution to their nonlinear response function.

Frequency conversion of the ultrafast laser sources to the mid-IR and far-IR is facilitated via coupling the spectrally broadened output into a nonlinear crystal designed for DFG. Difference frequencies are generated between the high power pump source frequency component(s) and frequency components(s) of the spectrally broadened source while ensuring temporal overlap of pulses generated by the two sources via appropriate optical delay stages.

Alternatively, frequency conversion of the ultrafast laser sources to the mid-IR and far-IR is facilitated via coupling the spectrally broadened output into a nonlinear crystal designed for DFG between low and high frequency spectral components of the spectrally broadened output. More particularly, a frequency difference signal is generated with red and blue distal portions of the spectrally broadened output.

DFG in nonlinear crystals or waveguides can enable spectral coverage in the mid-IR and/or far IR spectral regions. Tuning of the DFG output can be carried out by varying the power coupled into the nonlinear waveguide, for example a highly non-linear fiber (HNLF), arranged for spectral broadening. Alternatively, the chirp of the pulses coupled into the nonlinear waveguide can also be adjusted. Also periodically poled or optically patterned nonlinear crystals with fan-out poling- or pattern periods, as well known in the state of the art, can be used for wavelength tuning.

Frequency down-conversion from the near to mid-IR spectral region can also be performed. For example, with an Er fiber laser system and appropriate nonlinear fibers, a DFG output in the 2000 nm spectral region can be generated; such a source can in turn be used to seed a Tm fiber amplifier to provide a high power, phase stable, output in the 2000 nm spectral region. Similar systems for providing a seed source near 2000 nm can also be based on other fiber laser systems, such as Yb fiber laser systems.

Preferably, temporal overlap between the low frequency and high frequency spectral components inside the DFG crystal will be maximized. In at least one embodiment optical elements with differential group delay between the low and high spectral components can be inserted upstream of the nonlinear DFG crystal. Also an appropriate combination of mirrors and beamsplitters can be implemented to optimize the temporal overlap between the low and high frequency spectral components.

To increase the output power of spectrally broadened sources, large core dispersion shifted fibers can be implemented. Such fibers can be based on highly germania doped fibers or soft-glass fibers.

The mid-IR sources can be used in optical metrology, LIDAR, and spectroscopy as well as medical applications such as imaging or human tissue treatments.

In addition to the DFG output, the output from the spectrally broadened source can be utilized for many additional applications including, for example, microscopy and imaging.

DETAILED DESCRIPTION

Mid-IR frequency generation has been discussed in U.S. Pat. No. 8,040,929 ('929) to Imeshev et al. entitled "Optical parametric amplification, optical parametric generation, and optical pumping in optical fiber systems", filed Mar. 25, 2005, in U.S. patent application Ser. No. 12/399,435 ('435) to Fermann et al., entitled "Optical scanning and imaging systems based on dual pulsed laser systems", filed Mar. 6, 2009, and U.S. patent application Ser. No. 11/546,998 ('998) to Hartl et al. entitled "Laser based frequency standards and their applications", filed Oct. 13, 2006. Coherent ultra broadband light sources have further been discussed in 'Broadband Generation of Coherent Continua with Optical Fibers', U.S. Patent Application No. 61/483,472, ('472), filed May 6, 2011, to Fermann et al. A review of compact broadband mid-IR sources can further be found in U.S. Pat. No. 7,519,253 to Islam et al.

Conveniently, such sources can be constructed using frequency down-conversion or difference frequency generation (DFG) as for example disclosed in U.S. patent application Ser. No. 13/026,762, ('762) entitled, 'Compact, high brightness light sources for the mid and far IR', to M. E. Fermann et al. or in the '051 application. To reach the mid-IR spectral region the implementation of short pulse or mode locked Tm fiber systems, or generally fiber laser systems operating near 2000 nm, is beneficial as discussed in the '929 patent, as well as in U.S. Pat. No. 6,885,683 ('683) to Fermann et al.

Arrangements suitable for use in mid-IR frequency generation systems are disclosed in the '929 patent to Imeshev et al. For example, '929 discloses a fiber-based laser system having at least one Tm-doped fiber and one or more nonlinear crystals disposed to receive optical pulses. The one or more nonlinear crystals may be configured for frequency up-conversion or down-conversion of optical pulses. A compact fiber based source of amplified ultra broadband pulses including a continuum fiber that produces a continuum is also disclosed, and an optional fiber based CPA system. U.S. patent application Ser. No. 12/955,759 ('759), entitled 'Frequency comb source with large comb spacing', filed Nov. 29, 2010 to Fermann et al. includes a mode locked waveguide comb laser having a compact dispersion control unit (DCU) in the laser cavity. The DCU may be capable of producing net GVD in a range from a positive value to a negative value, and preferably provides continuous adjustment of dispersion. In various implementations a DCU may provide much lower loss than achievable with dispersion compensators based on fiber Bragg gratings.

The contents of the U.S. Ser. Nos. 11/546,998; 12/399,435; 12/955,759; 13/026,762; and 61/483,472 co-pending applications cited above are hereby incorporated by reference in their entirety. The contents of U.S. Pat. Nos. 5,880,877; 6,885,683; 7,809,222; and 8,040,929 cited above are hereby incorporated by reference in their entirety.

Figure 1:
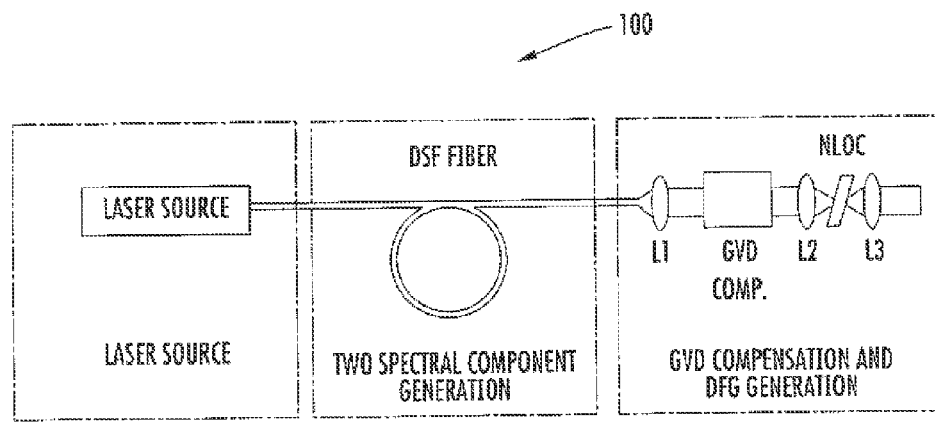
FIG. 1 schematically illustrates an exemplary DFG based mid-IR source. The setup is based on a stable source of ultrashort laser pulses, the generation of two spectrally separated but temporally proximate pulses, and subsequent DFG generation between optical frequencies of the two pulses.

FIG. 1 shows an exemplary embodiment of a DFG based light source 100. In this example a dispersion shifted fiber (DSF) receives pulses from a pulsed laser source. The DSF, acting as a nonlinear waveguide, spectrally broadens a short optical pulse and produces at least two distal spectral regions within the spectrally broadened spectrum, and at least two corresponding pulses in the time domain. The distal spectral regions are preferably distinct and clearly separated, near the extremes of the broadened spectrum. A group delay adjustment stage (GVD comp.) may be included to compensate the temporal separation caused by group velocity differences between two pulses (which correspond with the two respective spectral regions). A nonlinear optical crystal (NLOC) receives the two pulses and is configured for difference frequency generation (DFG) of the two spectral regions. Such difference frequency generation may be obtained over the frequencies of the distal spectral regions, or over a portion of the frequencies, which in turn may include spectrally filtered portion(s). In various embodiments, the NLOC, acting as difference frequency generator, generates an output signal at an output optical frequency that is the difference of the optical frequencies of the two pulses.

In various preferred embodiments the laser source generates high intensity laser pulses in the near infrared (IR). For example, an erbium or thulium based femtosecond fiber laser can be used as a stable source of high intensity ultrashort laser pulses in the near IR spectral region. In some implementations solid state or diode lasers can be used for pulse generation in this spectral region. In some embodiments appropriate combinations of all of these sources can be implemented. The light is coupled into the dispersion shifted nonlinear optical fiber (DSF) to generate two spectrally separated but temporally proximate pulses. The dispersion of the DSF fiber is designed to have: slightly anomalous dispersion at the center wavelength of the pump light source, a zero dispersion wavelength close to the center wavelength, and a not too steep dispersion slope so as to reduce temporal walk-off between the temporally proximate pulses. For example, the ratio of third-order dispersion, D3, over second order dispersion, D2, in the DSF can be chosen to be D3/D2<50 fs.

Figure 2:
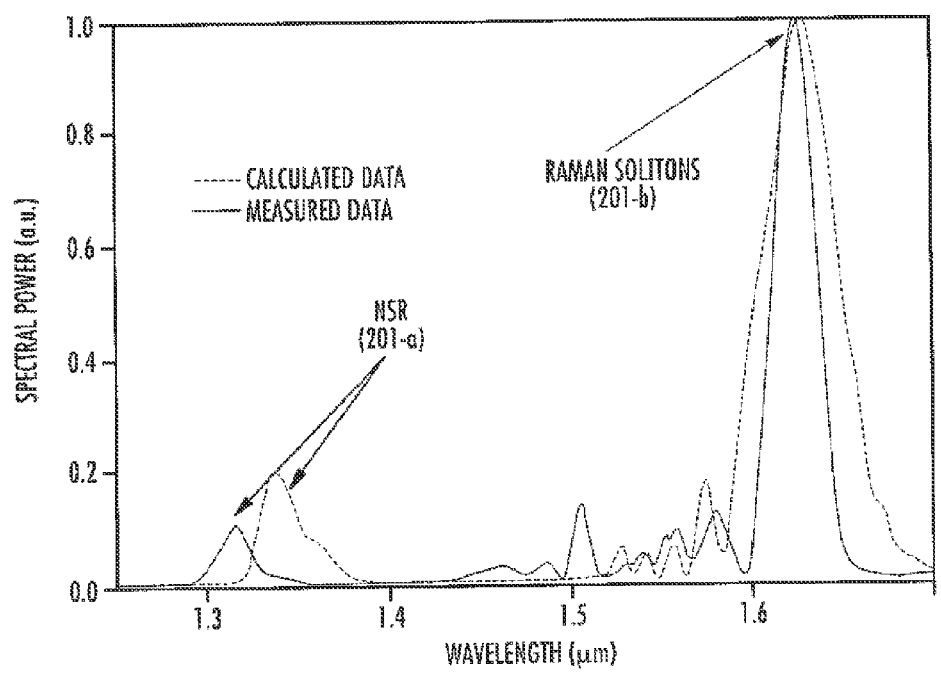
FIG. 2 schematically illustrates calculated and measured data for the spectral separation in a dispersion shifted optical fiber in conjunction with an exemplary Erbium-fiber laser.

During propagation in the DSF the pulse splits into a Raman-soliton and non-solitonic radiation (NSR), as illustrated in the example of FIG. 2. Two distinct spectral components are generated because those two components are essentially phase-matched. Because the two spectral components are overlapping in the temporal domain for an extended propagation length, very efficient power conversion into the shorter wavelength region is realized via four-wave mixing. Eventually the spectral components separate in time due to a slight difference in their group velocity.

For a specific estimate of spectral splitting, 150 fs pulses centered at 1560 nm were assumed, as may be generated with a typical erbium fiber laser. However, pulse compression, as is well known in the art, may be implemented to provide even shorter pulses. Such a system implementation is not separately discussed.

In operation the pulses may be coupled into a standard DSF. A Corning LEAF fiber specification was assumed, the fiber is well known in the art, and representative of a suitable large area, non-zero DSF. The results of the calculations are shown in FIG. 2 and compared to actual measurements obtained using an erbium fiber laser producing output pulses as used in the simulations. The Raman soliton is centered at 1620 nm and the NSR at 1310 nm (measured); this can be used to generate a DFG wavelength of 6.84 µm. The full spectral separation as shown in FIG. 2 is already observed after the first 30 cm of propagation.

Figure 3:
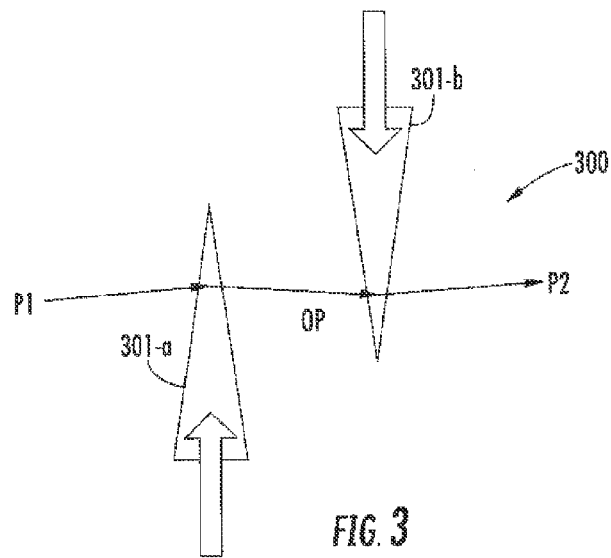
FIG. 3 schematically illustrates an adjustable group delay stage.

The two pulses correspond with the respective two distal spectral regions, in this example Raman soliton 201-b and NSR 201-a. The pulses accumulate a temporal separation of 200 fs after 40 cm in the DSF, with the blue pulse delayed. This time separation can be easily compensated with an optical component having anomalous dispersion for both spectral components, e.g. a suitable silica glass plate or an optical fiber; such a group delay adjustment stage is also shown in FIG. 1. The group delay adjustment stage can further include a prism or wedge pair 300 as shown in FIG. 3, which allows for an adjustment in group delay by adjustment of the optical path length through the two prisms or wedges 301a, 301b. In FIG. 3 the optical beam path (OP) is along the lines between points P1 and P2. The two wedges can be inserted into the optical beam path, and conveniently adjusted, along the direction of the two arrows in FIG. 3. Wedges as shown in FIG. 3 generate negligible spatial chirp for the small amount of group delay; therefore, it can be assumed that the two spectral regions propagate essentially co-linearly through the two prisms. When using prisms, the transmission loss can be further reduced when operating at Brewster's angle. Such an implementation is not separately shown. Because of the small required prism separation, the induced spatial chirp can also be neglected; co-linear propagation can also be assumed with operation at Brewster's angle.

In some embodiments a group delay adjustment stage may include multiple separated beam paths (e.g.: two paths) and optical components arranged for separation and/or recombination of the two distal spectral regions. Zero, one, or more delay stages may be utilized for adjustment of the group delay. The optical components may include any suitable combination of prisms, beam splitters, mirrors and the like, and may include bulk and/or integrated optics.

Referring back to FIG. 1, in order to implement DFG, the two spectral components are focused into a nonlinear optical crystal (NLOC). For the example spectrum shown in FIG. 2, GaS, GaSe, AgGaS$_2$ or AgGaSe$_2$ crystals can produce an output at a wavelength near 7000 nm. When the generation of wavelengths<7000 nm is of interest, other crystals can also be utilized, for example periodically poled LiNbO$_3$ is particularly attractive. Appropriate waveplates or other forms of polarization control can be further inserted up-stream of the DFG crystal (not shown) to tune the polarization state of the two interacting spectral regions inside the DFG crystal.

Wavelength tuning of the spectral output can be performed by changing the optical power coupled into the DSF or by insertion of a dispersion adjustment stage up-stream of the DSF. A dispersion adjustment stage can be constructed using two prisms similar to those shown FIG. 3, and is not separately illustrated here.

Figure 4:
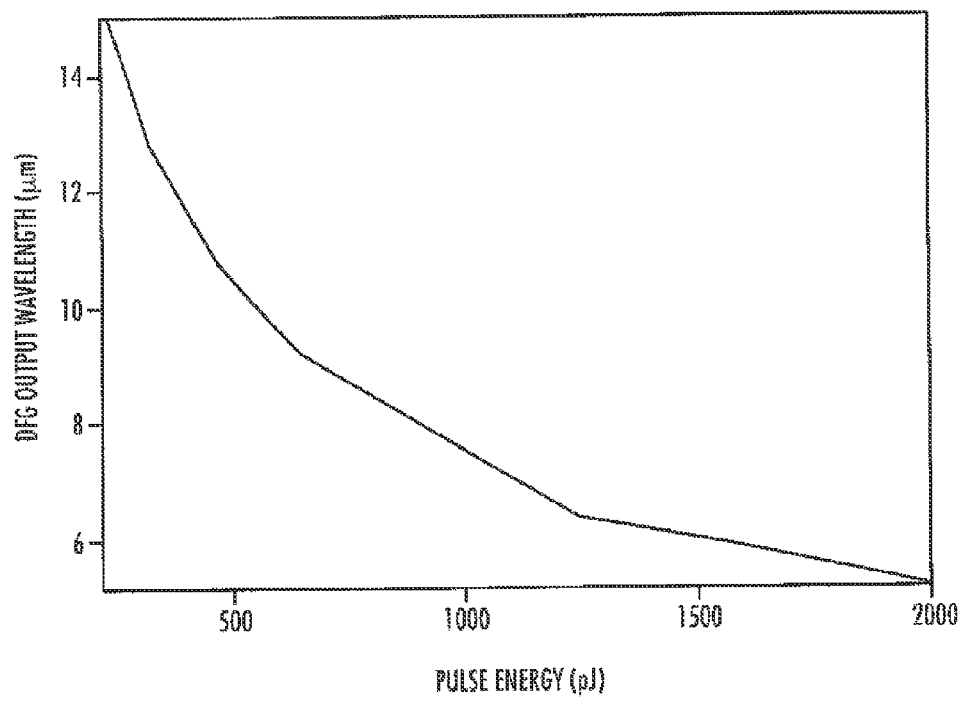
FIG. 4 is a plot of DFG wavelength vs. pulse energy, obtainable from a dispersion shifted optical fiber in conjunction with an exemplary Erbium-fiber laser.

Calculated DFG output wavelengths obtainable by changing the pulse energy coupled into the DSF are further shown in the plot of FIG. 4. By way of example, by changing the coupled pulse energy from about 300 pJ to 2000 nJ, a DFG output tunable from 15 µm to about 6 µm can be obtained, e.g.: in this example, over a nominal range of at least about 10 µm.

For some applications, a DFG output in the 1.7-6 µm spectral region and, more particularly in the 2 µm spectral region, may also be of interest. To obtain a DFG spectral output at these shorter wavelengths requires a greater spectral separation between the Raman soliton and the NSR. Such greater spectral separation can, for example, be obtained using optimized highly nonlinear fibers as discussed in Krauss et al. In particular, a DFG spectral output in the 2000 nm region can be generated, which can in turn be used for seeding a Tm or Ho fiber amplifier to provide high power radiation in the 2000 nm spectral region. Another advantage of DFG is that the output is automatically phase stable, which means that the carrier envelope offset frequency at the DFG output is automatically zero, as is well known in the art. Some applications may in fact require a non-zero carrier envelope offset frequency. The generation of a non-zero carrier envelope offset frequency can, for example, be ensured by frequency shifting the NSR with an acousto-optical modulator. This is further discussed with respect to FIG. 7.

In a specific example the output from an Er fiber laser system can be injected into a highly nonlinear fiber to generate NSR near 1050 nm and a Raman soliton near 2200 nm to generate a phase stable DFG output near 2000 nm. Conveniently, a nonlinear periodically poled LiNbO$_3$ crystal can then be implemented for DFG. Seed power levels for a Tm or Ho fiber amplifier system of a few mW near 2000 nm can be generated. In some configurations, further pulse compression stages can further be inserted upstream of the highly nonlinear fiber.

Alternatively, a seed near 2000 nm can also be generated with fiber lasers operating in the 1000 nm wavelength range and appropriate highly nonlinear fibers in conjunction with DFG. Fiber lasers operating in the 1000 nm wavelength range can for example include Nd and Yb fiber lasers.

A limitation with implementing standard DSF for DFG is the small core diameter of these fibers, which limits the available pulse energies at the two distal wavelengths. In at least one embodiment, much higher pulse energies can be obtained with dispersion shifted large core fibers or hollow-core photonic crystal fibers. Near a wavelength of 1560 nm, a large core dispersion shifted fiber can, for example, be constructed using highly germania doped silica fibers. A germanium concentration of between 10-50 mole % is required to shift the zero dispersion wavelength of large core germanosilicate fibers to the 1500 nm wavelength region (see for example J. W. Fleming, Dispersion in GeO$_2$—SiO$_2$ glasses, Appl. Opt., vol. 23, pp. 4486-4493 (1984). Generally, the exact dispersion of large core highly germania doped silica fibers depends on fabrication conditions, because the dispersion is influenced by stress, thermal annealing and other effects. Thus, calibration of the dispersion is preferred. Germanosilicate fibers with germania dopant concentrations in the core of up to 55 mole % have been reported by V. V. Dvoyrin et al., 'Tm$^{3+}$ doped CW fiber laser based on a highly GeO$_2$ doped dispersion shifted fiber', Optics Express, Vol. 19, pp. 7992-7999 (2011).

Figure 5:
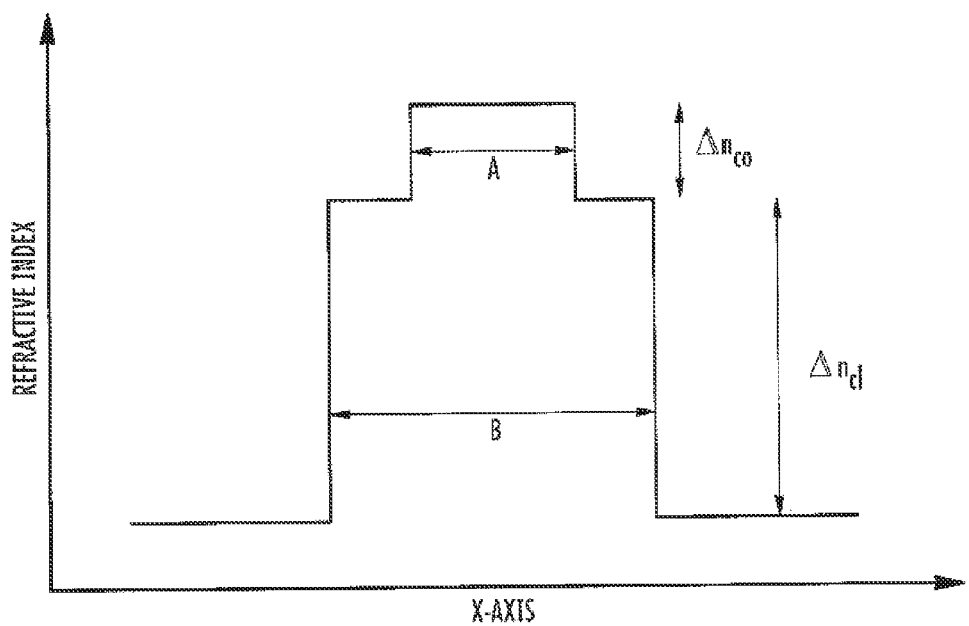
FIG. 5 schematically illustrates the refractive index profile of a large mode area dispersion shifted germanosilicate fiber.

An exemplary refractive index profile of such a large core dispersion shifted fiber is shown in FIG. 5. Here the fiber includes a raised cladding as for example disclosed in U.S. Pat. No. 5,880,877, entitled 'Apparatus and method for the generation of high power femtosecond pulses from a fiber amplifier', to Fermann et al. The raised cladding reduces the refractive index difference $\Delta n_{co}$ between the central core and a first cladding, while allowing for a large index difference between the core and the second outer cladding, where the second outer cladding typically includes pure silica glass or any other glass that is available in glass tubes as used in typical fiber fabrication processes. The design is particularly useful for large core dispersion shifted germanosilicate fibers, as it reduces the number of propagating core modes while allowing for large germania concentrations inside the core. Typical inner core diameters are chosen between 10-100 whereas typical germania concentrations in the core are selected between 10-50 mole %. For the purpose of the present disclosure we refer to large core fibers as fibers with a core diameter>10 µm. Such large core highly germania doped germanosilicate fibers can then further be generally characterized with having a zero dispersion wavelength longer than 1400 nm.

Figure 6:
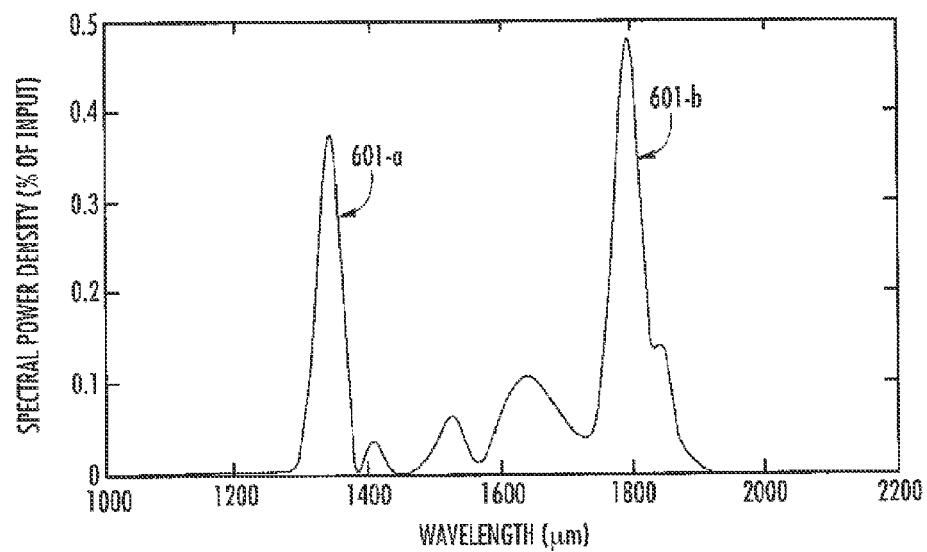
FIG. 6 shows the spectral output obtainable from a dispersion shifted large core optical fiber in conjunction with an exemplary Erbium-fiber laser.

An exemplary calculation of the output spectrum of a large core DSF is shown in FIG. 6, the spectrum having two distal spectral regions 601a, 601b. Input pulses with a pulse width of 100 fs and a pulse energy of 20 nJ were assumed. The DSF was further assumed to have a core diameter of 30 µm with a zero dispersion wavelength of 1.466 µm. The pulse energy in the Raman soliton (601-a) and the NSR (601-b) is >4 nJ. With such high pulse energies, DFG in nonlinear crystals can generate a conversion efficiency>20%, resulting in about 1 nJ of coherent mid IR generation, which is an attractive alternative to an optical parametric oscillator.

We further verified that the two distal spectral components generated in the DSF are coherent, i.e. they can be characterized by a first order coherence function>0.95. The definition of first order coherence is well known in the state of the art and not further explained here. Therefore, the radiation generated by DFG can also be highly coherent and high conversion efficiency for DFG can be realized for use in various embodiments.

When using Tm fiber laser pulse sources for spectral broadening, large core fibers based on glasses such as Schott lead silicate glasses, SF4, SF10 or SF47 can for example be used to provide slightly anomalous dispersion in the 1900-2000 nm wavelength range. Other soft-glass materials with different zero dispersion wavelengths adapted to the emission wavelength of the implemented laser pulse source may also be used.

Even higher pulse energies can be generated by using spectral splitting in gas-filled hollow core fibers such as Kagome fibers. Such spectral splitting was recently discussed in M. F. Saleh et al., 'Soliton self-frequency blue-shift in gas-filled hollow-core photonic crystal fibers', arXiv:1106.5606v1 [physics.optics] 28 Jun. 2011. As shown in FIG. 2 of Saleh et al., two distinct spectral regions corresponding to two distinct pulses can be obtained after some propagation distance. DFG can thus be implemented to generate a spectral output at the difference frequency of the two spectral components.

As an alternative to spectral splitting in optical waveguides or hollow-core fibers, where spectral splitting is dominated by third-order nonlinearities, optical waveguides with dominant second-order nonlinear materials can also be used for DFG. For example, the distal components of a supercontinuum generated in a periodically poled waveguide can be used to generate spectral output at their difference frequencies. Supercontinuum generation in periodically poled waveguides was, for example, described in Hartl et al., U.S. Pat. No. 7,809,222: "Laser based frequency standards and their applications", and is not further described here. As disclosed in '222, several different poling periods can be implemented in such a periodically poled waveguide to generate spectral regions of enhanced spectral density. One of the poling periods can then be adapted for DFG generation.

In many applications, frequency shifting in large core DSF, or spectral splitting, is of interest in its own right, for example in blue or red shifting of the spectral output of a laser. For example, using a high power Er fiber laser as a source in conjunction with a large core DSF, high energy pulses can be generated in the 1300 nm wavelength region with a spectral conversion efficiency>20%. Such compact short pulse laser sources operating at 1300 nm are of great interest in multi-modal microscopy and general imaging applications.

Figure 7:
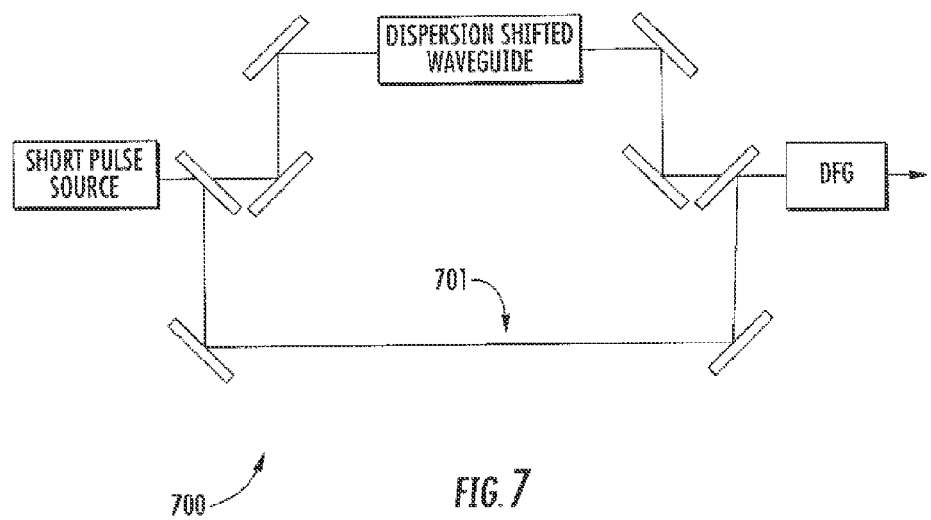
FIG. 7 schematically illustrates a compact high power DFG pulse source using a nonlinear waveguide for coherent supercontinuum generation.

DFG generation using an optical set-up as shown in FIG. 1 of the present application is highly beneficial in terms of reducing component count. In some embodiments a conventional system architecture for DFG as discussed in the '762 application, and also shown in FIG. 1 of Neely et al., is acceptable. Generally, one input to the DFG crystal can be derived via coherent supercontinuum generation as, for example, disclosed in '762. The other input can be obtained from the short pulse laser source directly. Such a system configuration 700 is shown in FIG. 7. Here short pulses are produced by the short pulse source, and each are subsequently divided into two parts by a first beam splitter. The first part is subsequently directed into a nonlinear waveguide designed to produce a highly coherent supercontinuum output. At least a spectral component of the supercontinuum output and the original spectral region emitted from the short pulse source are then recombined by a second beam splitter before being coupled into the DFG crystal. Additional mirrors can further be inserted (not shown) to adjust the group delay of the two pulses before coupling into the DFG crystal.

The configuration shown in FIG. 7 is particularly attractive for the generation of seed signals near 2000 nm via DFG based on Er or Yb mode locked fiber lasers. In particular, a DFG output with a selectable carrier envelope offset frequency can then be obtained by the insertion of an acousto-optic modulator in one of the two beam paths used for the NSR or Raman soliton radiation, respectively.

When implementing optically patterned or periodically poled nonlinear crystals for DFG, wavelength tuning can be conveniently obtained by implementing crystals with fan-out patterns or poling periods. Such fan-out crystals are well known in the state of the art and not further explained here. When using fan-out crystals, wavelength tuning can be obtained by translating the crystal in a direction perpendicular to the direction of the input beams, thereby changing the poling or pattern period that is being traversed by the input beams. In some embodiments a non-linear crystal may be tuned by adjustment of the crystal angular position relative to the propagation direction of an input beam. Various combinations of adjustments may also be implemented.

In some implementations, in order to provide high power pulses for DFG, the use of compact high power fiber lasers operating near 1550 or 2000 nm is highly beneficial. Such light sources were, for example, described in the '762 application.

Highly coherent supercontinuum generation can be generated using dispersion shifted highly Germania doped optical fibers as described in '472. Alternatively, nonlinear fibers or waveguides with a relatively high vibrational contribution to their nonlinear response function, as also discussed in '472, can be implemented. Highly coherent supercontinuum spectra are generally characterizable by a first order coherence function having a value>0.9 at two spectral locations within said supercontinuum, wherein said spectral locations are separated by at least half an octave.

Nonlinear waveguides based on materials with a predominantly third-order nonlinearity such as optical glasses or silicon can be implemented; alternatively nonlinear waveguides based on materials with a predominantly second-order nonlinearity such as periodically poled $LiNbO_2$ (PPLN) or optically patterned GaAs (OPGaAs) can also be used. Self-frequency shifting in such waveguides, as discussed in the '762 application, can be used to generate a frequency shifted input for DFG. Alternatively, supercontinuum generation in periodically poled waveguides as described in Hartl et al., U.S. Pat. No. 7,809,222: "Laser based frequency standards and their applications", can be used to produce a frequency shifted input for DFG.

Hybrid fiber structures including, for example, a chalcogenide glass core and a silica glass cladding can also be used for coherent supercontinuum generation. Such hybrid fiber structures were recently described in N. Ganzow et al., 'Supercontinuum generation in chalcogenide silica step-index fibers', Opt. Express., vol. 19, pp. 21003 (2011). In some embodiments large core dispersion shifted fibers can also be used for coherent supercontinuum generation.

When using fiber lasers operating near a wavelength range of 2000 nm, or generally operating at a wavelength>1700 nm, OPGaAs is particularly useful for high power DFG generation at wavelength>5000 nm. Such long wavelengths can generally not be obtained from periodically poled $LiNbO_3$ because of material absorption. With appropriate Tm or Ho based high power fiber lasers producing pulse energies of just a few nJ and pulse widths around 1 ps, very high conversion efficiencies to the wavelength range>5000 nm can be obtained. For example conversion efficiencies>1% can be expected with just a few nJ of pump at wavelengths>1700 nm and an appropriate frequency shifted spectral component. As a specific example, a Tm fiber laser system can produce several nJ of pulse energy near 1950 nm and an appropriate highly nonlinear waveguide can produce about 100 pJ of output near 2500 nm to produce a DFG conversion efficiency>1% at a wavelength near 8860 nm. Hence, by way of example, a short pulse Tm fiber laser operating at a repetition rate of 100 MHz may achieve an average power greater than 1 mW at DFG wavelengths. Such high average powers are very attractive for imaging and spectroscopic applications.

The high degree of coherence achieved with the DFG sources discussed here is of great interest in frequency comb applications such as precision spectroscopy. One limitation of DFG sources is, however, that the carrier envelope offset frequency of the DFG source is reduced to zero, as is well known in the state of the art. In order to generate a carrier envelope offset frequency for the DFG source it is thus useful to apply a small frequency shift to one of the two inputs to the DFG source. For example such small frequency shifts can be applied using an acousto-optic modulator as is well known in the state of the art. For example in FIG. 7 an acousto-optic modulator can be inserted in the beam path 701 of the short pulse source at the bottom of FIG. 7. Such implementations are not separately shown.

If a high degree of coherence of the DFG output is of limited interest, for example coherence below 0.9, it is sufficient to use a nonlinear fiber or waveguide that produces a frequency shifted output without regard to coherence. An exemplary system configuration is shown in FIG. 8, which demonstrated capability of achieving DFG output of about 1.5 mW over about a 7000 nm mid-IR to far-IR tuning range, and the degree of coherence was not considered.

Figure 8:
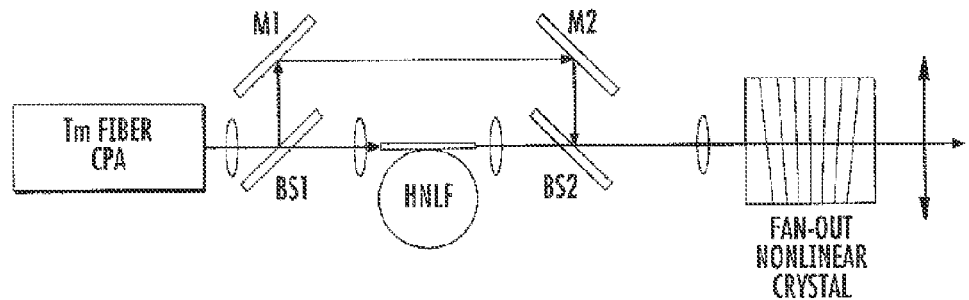
FIG. 8 schematically illustrates an exemplary arrangement of a DFG based mid IR source capable of achieving relatively high DFG output power over a wide IR tuning range.

In the example of FIG. 8, a Tm fiber based chirped pulse amplification system (Tm fiber CPA) produced a pulse energy between approximately 5-50 nJ at a wavelength of about 1950 nm at a repetition rate of 70 MHz, and with a pulse width of 150 fs. In this example the Tm fiber CPA included a positive dispersion fiber stretcher and a large core silica fiber as a compressor, eliminating the need for a bulk grating compressor. Moreover, the third order dispersion of both stretcher and compressor are approximately matched, i.e. they have opposite signs to facilitate high quality pulse compression. As an example, a leakage channel fiber with a core diameter of 50 µm was used as a compressor fiber, allowing the generation of 100 fs pulses with pulse energies of several tens of nJ.

A small fraction of the output of the Tm fiber CPA was injected into a highly nonlinear fiber (HNLF) for frequency shifting to the IR. In this particular example a single mode fluoride fiber with a core diameter of 6 µm was used. Pulse energy of about 1 nJ coupled into the fluoride fiber was sufficient for producing an output from the fluoride fiber near 2600 nm. The remaining portion of the Tm fiber CPA output was used as the pump beam and is directed via mirrors M1 and M2 to beamsplitter BS2.

The output near 2600 nm from the fluoride fiber and the pump beam from the Tm fiber CPA system were subsequently combined temporally and spatially at beam splitter BS2 and directed into the DFG crystal, where here a 1.6 mm long OpGaAs crystal with a fan-out pattern period varying from 58-82 µm as shown is implemented. The pump pulse energy incident on the crystal was about 5.5 nJ and the signal pulse energy incident on the crystal was about 300 pJ. The system produced an output near 8000 nm, though wavelength tuning from 6000 nm to 12500 nm, e.g.: approximately 6-13 µm (a 7000 nm range) in this example was achieved by translation of the OPGaAs crystal. Larger tuning ranges may be obtainable, for example up to about 10 µm, or up to about 20 µm. Alternatively, in some applications a narrow tuning range may be desirable, for example from several hundred nanometers and up to several microns.

In various implementations an even wider tuning range can be achieved by further changing the optical power coupled into the fluoride fiber and changing the output wavelength from the fluoride fiber. In the example above the average power in the DFG output was about 1.5 mW. Even higher DFG output powers can further be obtained by increasing the pulse energy at the pump and signal wavelengths as well as via the use of high pulse repetition rates. DFG output powers in the range of 10 mW and higher thus are achievable. For pump pulse energies>10 nJ, parametric amplification of the signal pulses can further be obtained, leading to further increases in DFG output powers. Parametric amplification with fiber pump sources was for example disclosed in '929 and is not further described here.

When using parametric amplification, the DFG output is further conveniently described as the idler output in agreement with standard nomenclature as used in the art. In some configurations, an idler output can be generated in a first DFG stage and the idler output can then be amplified using a second nonlinear crystal without the use of a signal wavelength. Such configurations are well known in the state of the art and are not further discussed here.

Frequency shifting in the fluoride fiber is induced via Raman shifting via the formation of Raman solitons as previously described in the '683 patent, and U.S. Pat. No. 8,040,929. Because frequency or Raman shifting in fluoride fibers to wavelengths>4000 nm is possible, the present source can produce an output tunable from about 1900 nm-15 µm, i.e. a spectral range of about 3 octaves can be covered, and a range up to about 15 µm.

In some embodiments self-limiting DFG generation can be implemented to limit, and preferably minimize, the relative intensity noise (RIN) of the DFG signal. For self-limiting DFG generation, the center of the DFG crystal tuning curve is selected to be below the Raman shifted wavelength. Any increase in Raman soliton power leads to an increase in Raman soliton wavelength which in turn reduces the DFG conversion efficiency. A similar self-limiting process was previously discussed in the incorporated '683 patent with respect to non-linear frequency conversion, including frequency doubling of Raman solitons, for example as disclosed in Cols 7-8 and FIGS. 2-3 of '683. Such a self-limiting process may also be adapted in various embodiments herein for reducing noise and providing stabilized DFG outputs. In various embodiments the corresponding non-linear process is DFG.

To further decease the RIN noise of the signal, pump pulses with a pulse width<150 fs and preferably <100 fs can be implemented, which in turn increases (or maximizes) the coherence of the Raman solitons (or generally the frequency shifted output in the highly nonlinear waveguide) and the DFG output. Appropriate pulse compression stages, as known in the art, can further be implemented to reduce the pulse width to less than 50 fs for a further reduction in RIN noise.

Instead of fluoride fibers, any other nonlinear waveguides can be implemented for frequency shifting of the pump wavelengths. For example, periodically poled $LiNbO_3$ can be used, other alternatives include bismuth, telluride or chalcogenide as well as hybrid fibers as discussed above. In particular self-frequency shifting in such periodically poled waveguides can be implemented for frequency shifting of the pump radiation. Aperiodic poling can also be implemented. Self-frequency shifting was for example disclosed in '762 and is not further described here.

Figure 9:
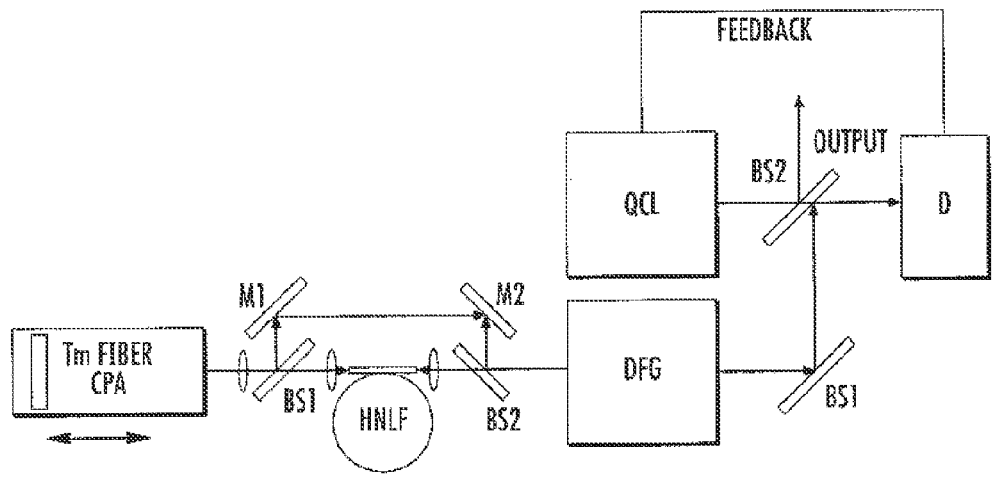
FIG. 9 schematically illustrates a wavelength tunable source with a precisely characterized wavelength output.

Many applications in high resolution spectroscopy further require a high power wavelength tunable source with a precisely characterized wavelength output. Such a tunable wavelength synthesizer can, for example, be constructed by locking an external quantum cascade laser to a frequency tooth of the DFG source as shown in FIG. 9. The source may include a Tm based chirped pulse amplification system (CPA) as discussed in the '929 patent so as to produce femtosecond pulses, with relatively high pulse energy, and preferably with a pulse width less than about 150 fs. Such CPA systems include a pulse stretcher, optical amplifier, and a pulse compressor. In some embodiments a Tm fiber laser may be utilized, with an optional fiber amplifier, and without a compressor and stretcher. In FIG. 9 a Tm fiber CPA includes an oscillator configured with a tunable repetition rate; at least one embodiment may include adjusting the oscillator cavity length via mirror adjustment as schematically illustrated in FIG. 9 (arrow).

In the example of FIG. 9 DFG between the output of a Tm fiber laser (or from a TM based CPA system as shown) and the output from a frequency broadening section using a highly nonlinear fiber or waveguide generates DFG output in the mid IR spectral region. The output from a slave single frequency quantum cascade laser (QCL) and the output from the DFG crystal are further combined via beam splitter BS2 and a beat signal between the DFG output and the QCL is detected with detector D. The output from the detector/filter module may be utilized to control the slave QCL laser in a feedback arrangement. In this arrangement the beat signal between the DFG output and the slaved QCL are used via a feedback loop to control the wavelength of the single frequency slave laser as illustrated in FIG. 9. Analog and/or digital signal processing (not shown) may also be utilized in the feedback system to monitor and/or control various parameters. For example, while tuning the repetition rate of the Tm laser the output wavelength of the quantum cascade slave laser can also be tuned by simply keeping the beat signal frequency constant. This can be done, for example, by appropriately controlling the drive current to the quantum cascade laser, or controlling its temperature, as is well known in the state of the art. Such schemes were previously discussed in the '759 application. The use of an optimized DFG section as disclosed herein is particularly useful for controlling and tuning the wavelength of QCLs operating at wavelengths>5000 nm.

At least one embodiment includes an optical source producing an output at a wavelength>5000 nm. The optical source includes a mode locked fiber laser producing a primary output within the wavelength range from 1700-2300 nm. A highly nonlinear waveguide receives the primary output and shifts at least part of the primary output, thereby producing a secondary output. The source includes a nonlinear crystal configured for frequency generation at a difference frequency between the primary and secondary output, producing an output at a wavelength>5000 nm. The output has an average power>100 µW.

In any or all embodiments a portion of primary output may be red-shifted to produce a secondary output.

In any or all embodiments an output at wavelengths>5000 nm may be generated via DFG.

In any or all embodiments output at wavelengths>5000 nm may be generated via at least one OPA stage.

In any or all embodiments a primary source may include a Tm or Ho fiber source.

In any or all embodiments a non-linear crystal for DFG may include optically patterned GaAs (OPGaAs).

In any or all embodiments a non-linear crystal for DFG may be periodically poled and/or arranged as a fan-out crystal.

In any or all embodiments an output may be wavelength tunable via adjustment of a nonlinear crystal with respect to an input beam.

In any or all embodiments an output may be wavelength tunable via translating a fan-out crystal with respect to an input beam.

In any or all embodiments an output may be wavelength tunable via adjustment a periodically poled crystal with respect to an input beam.

In any or all embodiments a primary output may be generated with a laser system including a Tm mode locked fiber.

In any or all embodiments a highly non-linear waveguide may include a highly non-linear fiber (HNLF).

In any or all embodiments a HNLF may include a single mode or multimode fluoride fiber.

In any or all embodiments a source may be capable of being tuned over a portion of wavelengths in a mid-IR and/or far IR wavelength regime.

In any or all embodiments a source may be arranged such that wavelengths are tunable by controlling input power to a non-linear waveguide.

In any or all embodiments wavelengths may be tunable over a range of up to about 15 µm.

In any or all embodiments a primary output may include a pulse width less than about 150 fs.

In any or all embodiments primary and secondary outputs may include respective non-soliton and Raman soliton Raman portions.

In any or all embodiments a frequency shifter may be disposed in a path of either a primary or secondary output.

In any or all embodiments a frequency shifter may include an acousto-optic frequency shifter.

In any or all embodiments a highly non-linear waveguide may produce a spectrally broadened output characterizable by a first order coherence function having a value>0.9 at two spectral locations within a broadened spectrum.

In any or all embodiments a highly non-linear waveguide may produce a spectrally broadened output characterizable by a first order coherence function having a value less than 0.9 at two spectral locations within a broadened spectrum.

At least one embodiment includes a source producing infrared pulses. The source includes a laser system producing short optical pulses. A nonlinear optical waveguide receives a short optical pulse and spectrally broadens a short optical pulse in such a way as to produce, as an output from the nonlinear waveguide, at least two distal spectral regions within a broadened spectrum, and at least two corresponding short pulses in the time domain. The source includes a difference frequency generator including a nonlinear crystal receiving the waveguide output and generating an output signal having an optical frequency that is a difference between a first optical frequency and a second optical frequency, the first optical frequency contained in a first of the two distal regions and the second optical frequency contained in a second of the two distal spectral regions. The two pulses corresponding to the two spectral regions propagate essentially collinearly from the waveguide output to the nonlinear crystal input.

In any or all embodiments the source may include a group delay adjustment stage inserted between a nonlinear waveguide output and a nonlinear crystal input, the group delay adjustment stage configured to allow adjustment of the group delay between two distal spectral regions.

In any or all embodiments a group delay adjustment stage may include at least one optical prism.

In any or all embodiments a group delay adjustment stage may include a section of bulk material.

In any or all embodiments the source may include a chirp adjustment stage up-stream from a nonlinear waveguide, the stage configured for adjustment of the chirp of the pulses being received by the nonlinear waveguide.

In any or all embodiments a chirp adjustment stage may include at least one of an optical prism and grating.

In any or all embodiments a nonlinear waveguide may include a nonlinear optical fiber or a nonlinear waveguide.

In any or all embodiments a laser system may include one of a fiber, a waveguide, a diode laser, a solid-state laser system or a combination thereof.

In any or all embodiments the laser system may include a Er, Er/Yb, Tm, Tm/Yb or Ho fiber laser.

In any or all embodiments a nonlinear waveguide may be arranged with slightly anomalous dispersion at a center wavelength of pulses produced by the laser system.

In any or all embodiments a nonlinear waveguide may include germanosilicate or lead silicate glass.

In any or all embodiments a nonlinear waveguide may include a soft optical glass.

In any or all embodiments a nonlinear waveguide may include a germanosilicate optical fiber with a core diameter>10 μm.

In any or all embodiments nonlinear waveguide may include a gas filled hollow-core optical fiber.

At least one embodiment includes a dispersion shifted germanosilicate optical fiber. The fiber includes: a core having diameter larger than 10 μm; a germanium concentration>10 mole %; and a zero dispersion wavelength longer than 1400 nm.

In any or all embodiments a dispersion shifted germanosilicate optical fiber may include: a refractive index difference between core and cladding which is substantially smaller than a refractive index difference between the glass including the core structure and silica glass.

In any or all embodiments a dispersion shifted germanosilicate optical fiber may be configured for optical frequency shifting of short optical pulses.

At least one embodiment includes a source producing infrared pulses in the 2000 nm spectral region. The source includes a laser system that produces short optical pulses. A nonlinear optical waveguide receives the short optical pulses. The nonlinear waveguide spectrally broadens a short optical pulse in such a way as to produce, as an output from the nonlinear waveguide, at least two distal spectral regions within the broadened spectrum, and at least two corresponding short pulses in the time domain. The source includes a difference frequency generator including a nonlinear crystal receiving the waveguide output. The difference frequency generator generates an output signal having an optical frequency that is a difference between a first optical frequency and a second optical frequency, the first optical frequency contained in a first of the two distal regions and the second optical frequency contained in a second of the two distal spectral regions. A group delay adjustment stage allows adjustment of the group delay between the two distal spectral regions to ensure temporal overlap of the two pulses that correspond to the spectral regions, at least during propagation of the two pulses in the non-linear crystal included in the difference frequency generator.

Any or all embodiments may include a fiber amplifier to amplify the output from the difference frequency.

In any or all embodiments a fiber amplifier may include a Tm, a Tm/Ho or a Ho amplifier.

In any or all embodiments a group delay adjustment stage may allow for essentially collinear propagation of the two distal spectral regions from the waveguide output to the nonlinear crystal input.

In any or all embodiments a group delay adjustment may include: separate beam paths; optical components arranged for separation and/or recombination of the two distal spectral regions; and zero, one, or more delay stages for adjustment of the group delay.

In any or all embodiments a laser system producing short optical pulses may include at least a mode locked laser.

Any or all embodiments may include a mode locked fiber laser.

Any or all embodiments may include at least one pulse compression stage.

Any or all embodiments may include a frequency shifter configured for frequency shifting the spectrum of either of the two distal spectral regions.

In any or all embodiments a frequency shifter may include an acousto-optic frequency shifter.

For purposes of summarizing the present invention, certain aspects, advantages and novel features of the present invention are described herein. It is to be understood, however, that not necessarily all such advantages may be achieved in accordance with any particular embodiment Thus, the present invention may be embodied or carried out in a manner that achieves one or more advantages without necessarily achieving other advantages as may be taught or suggested herein.

While only certain embodiments have been specifically described herein, it will be apparent that numerous modifications may be made thereto without departing from the spirit and scope of the invention. For example, various embodiments and features therein are generally not to be construed as mutually exclusive; such embodiments and features may be combined and/or modified by a person skilled in the art. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. An optical source producing an output at a wavelength>5000 nm, comprising:
a mode locked fiber laser producing a primary output within the wavelength range from 1700-2300 nm;
a highly nonlinear waveguide receiving said primary output and shifting a least part of said primary output, thereby producing a secondary output shifted relative to said primary output; and
a nonlinear crystal configured for frequency generation at a difference frequency between said primary and secondary outputs, and producing an output at a wavelength>5000 nm, said output having an average power>100 μW.

2. The optical source according to claim 1, wherein said output at a wavelength>5000 nm is generated via difference frequency generation.

3. The optical source according to claim 1, wherein said output at wavelengths>5000 nm is generated via at least one optical parametric amplifier stage.

4. The optical source according to claim 1, wherein said primary source comprises a Tm or Ho fiber source.

5. The optical source according to claim 1, wherein said non-linear crystal for difference frequency generation comprises optically patterned GaAs.

6. The optical source according to claim 1, wherein said non-linear crystal for difference frequency generation is periodically poled and/or arranged as a fan-out crystal.

7. The optical source according to claim 1, wherein said output is wavelength tunable via adjustment of said nonlinear crystal with respect to an input beam.

8. The optical source according to claim 6, wherein said output is wavelength tunable by translating said fan-out crystal with respect to an input beam.

9. The optical source according to claim 6, wherein said output is wavelength tunable via adjustment of said periodically poled crystal with respect to an input beam.

10. The optical source according to claim 1, wherein said primary output is generated with a laser system comprising a Tm mode locked fiber.

11. The optical source according to claim 1, wherein said highly non-linear waveguide comprises a highly non-linear fiber.

12. The optical source according to claim 11, wherein said highly non-linear fiber comprises a single mode or multimode fluoride fiber.

13. The optical source according to claim 1, wherein said source is capable of being tuned over a range of wavelengths in the mid-IR and/or far IR wavelength regime.

14. The optical source according to claim 1, wherein said source is arranged such that wavelengths are tunable by controlling input power to said non-linear waveguide.

15. The optical source according to claim 14, wherein wavelengths are tunable over a range of up to about 15 μm.

16. The optical source according to claim 1, wherein said primary output comprises a pulse width less than about 150 fs.

17. The optical source according to claim 1, wherein said primary output comprises a pulse width less than about 50 fs.

18. The optical source according to claim 1, wherein said primary and secondary outputs comprise respective non-soliton and Raman soliton portions.

19. A source producing infrared pulses, comprising:
a laser system producing short optical pulses;
a nonlinear optical waveguide receiving said short optical pulses, said nonlinear waveguide spectrally broadening a short optical pulse in such a way as to produce, as an output from said nonlinear waveguide, at least two distal spectral regions within said broadened spectrum, and at least two corresponding short pulses in the time domain; and
a difference frequency generator comprising a nonlinear crystal receiving said waveguide output and generating an output signal having an optical frequency that is a difference between a first optical frequency and a second optical frequency, said first optical frequency contained in a first of said two distal regions and said second optical frequency contained in a second of said two distal spectral regions;
wherein the two pulses corresponding to the two distal spectral regions propagate essentially collinearly from the waveguide output to the nonlinear crystal input.

20. The source of infrared pulses according to claim 19, said source further comprising a group delay adjustment stage inserted between nonlinear waveguide output and nonlinear crystal input, said group delay adjustment stage configured to allow adjustment of the group delay between the two distal spectral regions.

21. The source of infrared pulses according to claim 20, wherein said group delay adjustment stage comprises at least one optical prism.

22. The source of infrared pulses according to claim 20, wherein said group delay adjustment stage comprises a section of bulk material.

23. The source of infrared pulses according to claim 19, said source further comprising a chirp adjustment stage upstream from said nonlinear waveguide, and configured for adjustment of the chirp of the pulses being received by said nonlinear waveguide.

24. The source of infrared pulses according to claim 23, wherein said chirp adjustment stage comprises at least one of an optical prism and grating.

25. The source of infrared pulses according to claim 19, wherein said nonlinear waveguide comprises a nonlinear optical fiber or a nonlinear waveguide.

26. The source of infrared pulses according to claim 19 wherein said laser system comprises one of a fiber, a waveguide, a diode laser, a solid-state laser system or a combination thereof.

27. The source of infrared pulses according to claim 19, wherein said laser system comprises a Er, Er/Yb, Tm, Tm/Yb or Ho fiber laser.

28. The source of infrared pulses according to claim 19, wherein said nonlinear waveguide is arranged with slightly anomalous dispersion at the center wavelength of the pulses produced by said laser system.

29. The source of infrared pulses according to claim 19, wherein said nonlinear waveguide comprises germanosilicate or lead silicate glass.

30. The source of infrared pulses according to claim 19, wherein said nonlinear waveguide comprises a soft optical glass.

31. The source of infrared pulses according to claim 19, wherein said nonlinear waveguide comprises a germanosilicate optical fiber with a core diameter>10 µm.

32. The source of infrared pulses according to claim 19, wherein said nonlinear waveguide comprises a gas filled hollow-core optical fiber.

33. A dispersion shifted germanosilicate optical fiber, comprising:
- a cladding;
- a core within said cladding and having a diameter larger than 10 µm and a germanium concentration>10 mole %; and
- a zero dispersion wavelength longer than 1400 nm.

34. A dispersion shifted germanosilicate optical fiber according to claim 33, said optical fiber comprising: a refractive index difference between core and cladding which is substantially smaller than the refractive index difference between the glass comprising the core and silica glass.

35. A dispersion shifted germanosilicate optical fiber according to claim 33, wherein said fiber is configured for optical frequency shifting of short optical pulses.

36. The optical source according to claim 1, further comprising: a frequency shifter inserted in a path of either the primary or secondary output.

37. The optical source according to claim 36, wherein said frequency shifter comprises an acousto-optic frequency shifter.

38. A source producing infrared pulses in the 2000 nm spectral region, comprising:
- a laser system producing short optical pulses;
- a nonlinear optical waveguide receiving said short optical pulses, said nonlinear waveguide spectrally broadening a short optical pulse in such a way as to produce, as an output from said nonlinear waveguide, at least two distal spectral regions within said broadened spectrum, and at least two corresponding short pulses in the time domain;
- a difference frequency generator comprising a nonlinear crystal receiving said waveguide output and generating an output signal having an optical frequency that is a difference between a first optical frequency and a second optical frequency, said first optical frequency contained in a first of said two distal regions and said second optical frequency contained in a second of said two distal spectral regions; and
- a group delay adjustment stage allowing adjustment of the group delay between the two distal spectral regions to ensure temporal overlap of the two pulses corresponding to said spectral regions, at least during propagation of the two pulses in the non-linear crystal of said difference frequency generator.

39. A source producing infrared pulses in the 2000 nm spectral region according to claim 38, further comprising a fiber amplifier amplifying the output from said difference frequency generator.

40. A source producing infrared pulses in the 2000 nm spectral region according to claim 39, said fiber amplifier comprising a Tm, a Tm/Ho or a Ho amplifier.

41. A source according to claim 38, said group delay adjustment stage allowing for essentially collinear propagation of the two distal spectral regions from the waveguide output to the nonlinear crystal input.

42. A source according to claim 38, wherein said group delay adjustment stage comprises: separate beam paths; optical components arranged for separation and/or recombination of the two distal spectral regions; and zero, one, or more delay stages for adjustment of the group delay.

43. A source according to claim 38, said laser system producing short optical pulses comprising at least a mode locked laser.

44. A source according to claim 43, said laser system further comprising a mode locked fiber laser.

45. A source according to claim 44, said laser system further comprising at least one pulse compression stage.

46. The optical source according to claim 38, further comprising: a frequency shifter configured for frequency shifting the spectrum of either of said two distal spectral regions.

47. The optical source according to claim 46, wherein said frequency shifter comprises an acousto-optic frequency shifter.

\* \* \* \* \*